Figure 1:
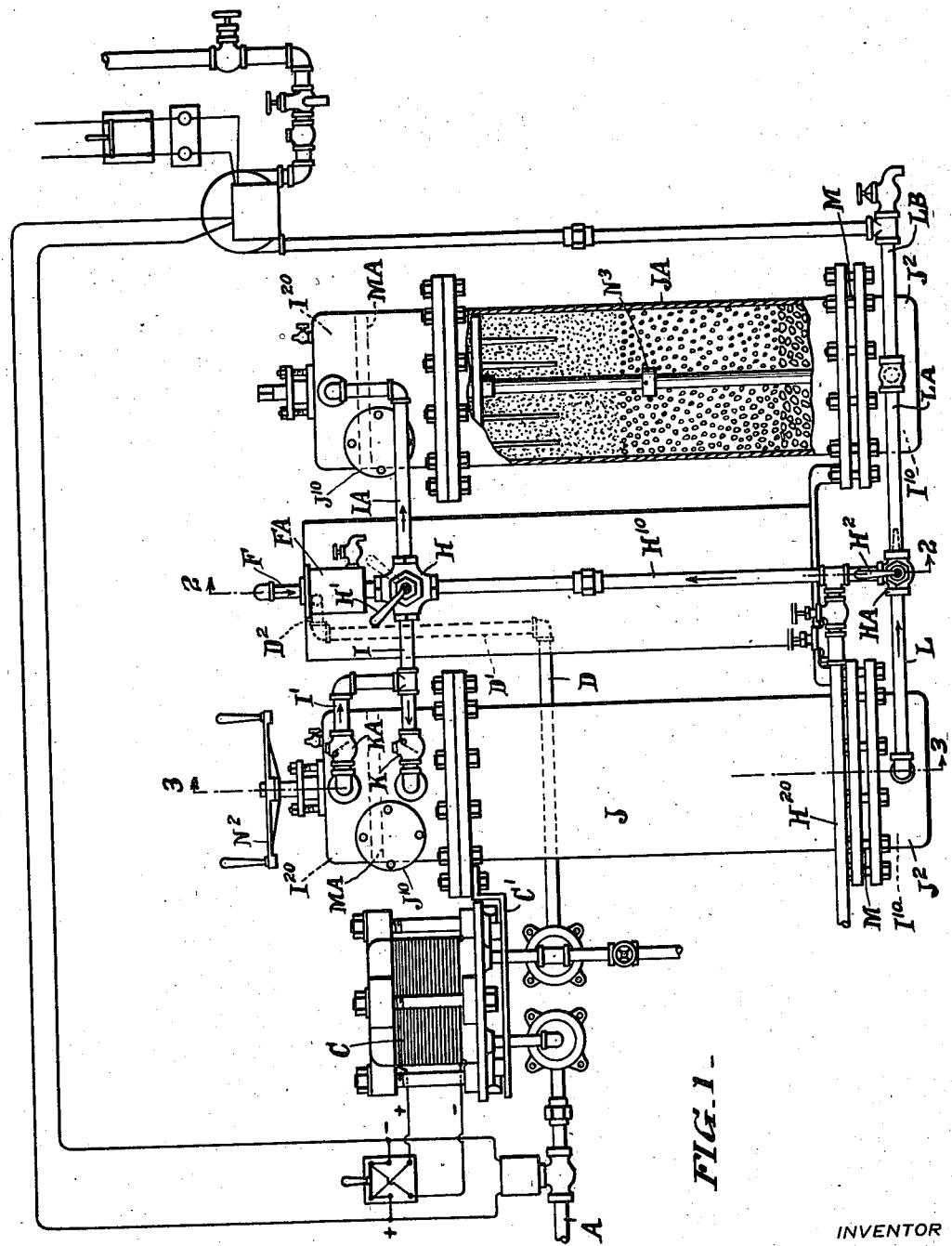

H. B. HARTMAN.
WATER PURIFYING APPARATUS.
APPLICATION FILED AUG. 12, 1913.

1,139,969.

Patented May 18, 1915.
2 SHEETS—SHEET 1.

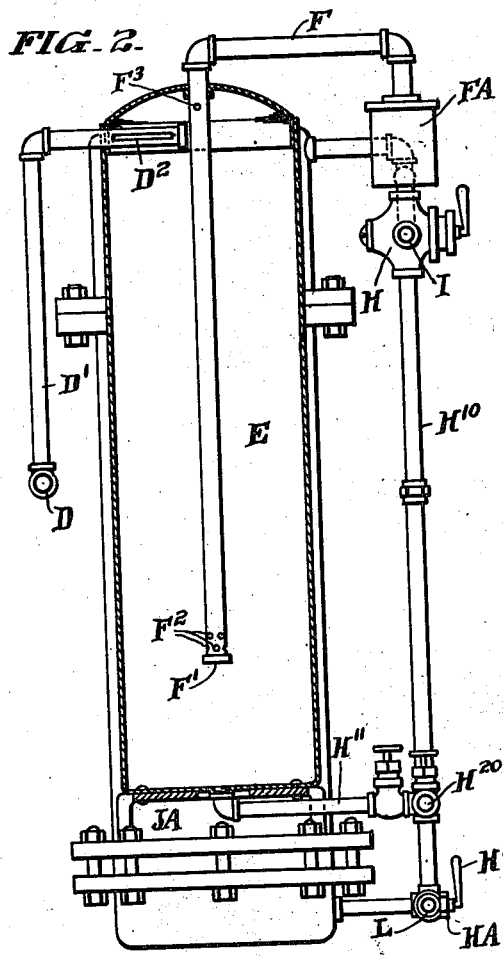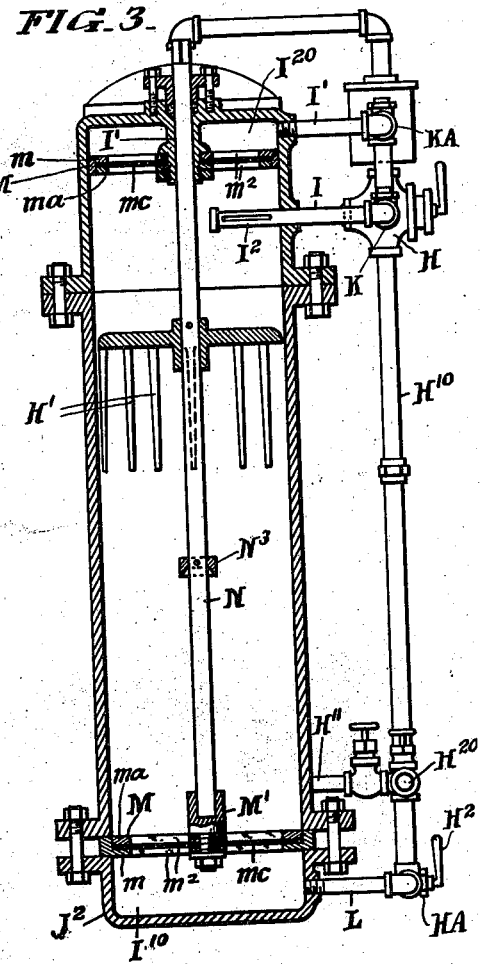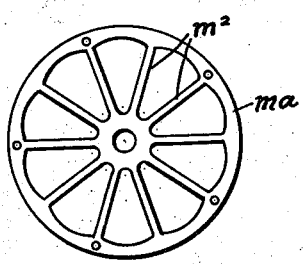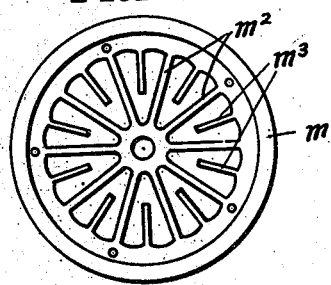

UNITED STATES PATENT OFFICE.

HARRY B. HARTMAN, OF SCOTTDALE, PENNSYLVANIA, ASSIGNOR TO ELECTRIC WATER STERILIZER COMPANY, OF SCOTTDALE, PENNSYLVANIA, A CORPORATION OF PENNSYLVANIA.

WATER-PURIFYING APPARATUS.

1,139,969.    Specification of Letters Patent.    Patented May 18, 1915.

Application filed August 12, 1913. Serial No. 784,300.

*To all whom it may concern:*

Be it known that I, HARRY B. HARTMAN, a citizen of the United States of America, residing in Scottdale, in the county of Westmoreland, in the State of Pennsylvania, have invented certain new and useful Improvements in Water-Purifying Apparatus, of which the following is a true and exact description, reference being had to the accompanying drawings, which form a part thereof.

My present invention consists in improved apparatus especially devised for purifying water in accordance with the general plan heretofore known, of first subjecting the water to electrolytic action and thereafter separating out of the water precipitated or suspended impurities.

The object of my invention is to so construct the filtering provisions and so connect them to the coagulating chamber of the apparatus that the flaky coagulum resulting from the electrolytic action on the water treated may be passed into the filtering provisions and deposited on a filter bed therein without being broken up in the normal operation of the apparatus, while when a reverse flow through to the filtering bed is had in cleaning the latter, the filter bed material will be prevented from washing out of the chamber in which it is contained.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described a preferred form of apparatus embodying the invention.

Of the drawings: Figure 1 is a somewhat diagrammatic representation with parts broken away and in section of a water purifying plant constructed in accordance with the present invention; Fig. 2 is an elevation partly in section on the line 2—2 of Fig. 1; Fig. 3 is an elevation partly in section on the line 3—3 of Fig. 1; Fig. 4 is a plan view of a portion of the filter strainer construction employed; Fig. 5 is a plan view of another portion of the filter strainer; Fig. 6 is a partial sectional elevation of the filter strainer.

In the water purifying plant shown by the drawings A represents the raw water supply pipe leading to the electrode box C.

The electrode box C, in which water is subjected to electrolytic action may well be, and is shown as being, of the same general construction as the electrode box disclosed and claimed in my prior patent No. 1,065,361, granted June 24, 1913. In view of this fact and the further fact that the special construction of the electrode box forms no part of my present invention, it is unnecessary for me to illustrate and describe the electrode box used in detail. From the outlet of the electrode box C the water passes through the pipe D and the branch pipe D' to the coagulation chamber E. As shown, the pipe D' terminates in a slotted end portion $D^2$ located within the chamber E at the upper end of the latter, and the slots in the end portion $D^2$ are so arranged as to insure a quiet and distributed flow of water into the upper end of the chamber E. From the chamber E the water passes through the pipe F, which, as shown, comprises a vertical portion passing through the top wall of the chamber E and extending down into the latter to a point adjacent but some distance above the lower end of the latter. The lower end of this portion of the pipe F is closed by cap F', and the pipe is formed with perforations $F^2$ adjacent the cap which insure a quiet and distributed flow of water from the lower portion of the coagulation chamber E into the pipe F. The pipe F in the construction shown is connected to the top of a small chamber FA which in normal operation may be regarded as forming nothing more than a portion of the pipe F, but under conditions, as hereinafter explained, may receive chemical matter to be added to the water. The lower end of the chamber FA is connected to one port of the four-way valve H. The latter is formed with oppositely disposed ports connected by pipes I and IA to the filter chambers J and JA located on opposite sides of the coagulation chamber E and is also formed with a port connected by the pipe $H^{10}$ to a port of the valve HA hereinafter referred to. The valve H in the full line position of its operating handle H' connects the chamber FA to the pipe I, and connects the pipe IA to the pipe $H^{10}$. When the handle H' occupies the dotted line position the chamber FA is connected to the pipe IA, and the pipe $H^{10}$ is connected to the pipe I.

Of the two filters, J and JA, the filter J serves in normal operation as a preliminary filter, and the filter JA as the final filter. As shown, these filters are identical in construction, although the water supply connections to the filters differ slightly, as hereinafter explained. As shown, each filter comprises a casing having a separable lower end portion $J^2$ secured to the body of the filter casing by bolts which also serve to secure in place the bottom filter strainer M which is clamped at its margin between the body of the casing and the lower section $J^2$. As shown, the filter strainer M comprises a spider-like member $m$ recessed at its upper side to receive another spider-like member $ma$, slightly smaller in diameter. Wire gauze $mc$ is clamped between the spiders which are secured together in the assembled condition of the apparatus by bolts or rivets $m'$. As shown, the spider members $m$ and $ma$ are each formed with registering radial arms $m^2$ which extend between the rim of the member and the hub portion thereof and clamp the gauze along radial lines. Furthermore, the lower spider member $m$ is formed with a second set of arms $m^3$ which form an additional support for the gauze $mb$. In the normal condition of the apparatus the absence of arms on the spider $ma$, corresponding to the arms $m^3$ on the spider member $m$, permits the gauze $mb$ to have a certain freedom to vibrate in the flushing out operation, which is desirable at that time. The strainer M supports the usual granular filter bed, and the space $I^{10}$ in the section $J^2$ below the filter strainer M forms the water outlet chamber of the filter in normal operation. A filter strainer MA, substantially like the strainer M described except that it is somewhat smaller in diameter, is secured in place near the top of each filter chamber, being attached, as shown to a central boss $I'$ carried by the upper end head of the corresponding filter chamber. The filter screen MA which only comes into service during the washing out operation has the spider member $m$ carrying the extra set of arms located above the spider section $ma$. The boss $I'$ serves as the upper bearing for the agitator shaft N, the lower end of which is journaled in a part $M'$ secured to the center of the lower filter strainer M. The shaft N has secured to it a pronged agitator $N'$ and may be rotated by means of the handle $N^2$ secured to the upper end of the shaft N, to stir up the filter material when the corresponding filter is being washed out. As shown the slotted end $I^2$ of the pipe I open to the filter J beneath the filter screen MA, but a branch pipe $I'$ connects the pipe I to the chamber $I^{20}$ above the filter screen MA. A check valve K, which, as shown in Fig. 11 comprises a swinging valve member $K'$ pivotally connected to the valve casing at $K^2$, is connected in the pipe I between the filter J and the branch pipe $I'$. This valve permits flow into and prevents a flow out of the filter through the portion of the pipe I in which the valve is located. A similar check valve KA working in the opposite direction, however, is provided in the branch pipe $I'$. The valve KA permits water to flow out of the filter J through the pipe $I'$ during the flushing out operation but prevents water from flowing into the filter through the pipe $I'$ in normal operation. The pipe IA leading from the valve H to the filter chamber JA opens to the latter above the upper filter screen MA therein and does not contain any valve corresponding to the valve K or KA.

The valve HA has in addition to the port to which the pipe $H^{10}$ is connected two other ports, one connected by a pipe L to the chamber $I^{10}$ of the filter J, and the other by a pipe LA to the chamber $I^{10}$ of the filter JA. The chamber $I^{10}$ of the filter JA is connected also to the discharge pipe LB which, as shown, forms an extension of the pipe LA. In the normal condition of the apparatus with the handle $H^2$ of the valve HA in the full line position, the valve HA connects the pipe L to the pipe $H^{10}$ and the pipe LA is closed at its end adjacent the valve HA. When the handle $H^2$ of the valve HA is in its dotted line position, however, the pipe L is connected to the pipe LA and the pipe $H^{10}$ is out of communication with both pipes L and LA.

$H^{20}$ represents a valved branch pipe leading from the pipe $H^{10}$ to waste.

In operation the water passing into the electrode box through the raw water supply pipe A and valve B is subjected to the desired electrolytic action in its passage through the electrode box C, and is discharged through the pipes D and D' into the coagulation chamber E. From the coagulation chamber E the water passes in normal operation through the pipe F to the valve H and thence through the pipe I and valve K into the upper end of the filter chamber J. From the lower end of the filter J the water passes through the pipe L, valve HA, and pipe $H^{10}$ back to the valve H. From the latter the water passes through the pipe IA to the top of the filter JA. From the bottom of the filter JA the purified and filtered water passes into the discharge pipe LB. With the arrangement and mode of operation described, the flaky coagulum produced by the electrolytic action on the water in the electrode box C is passed from the latter into the top of the filter chamber J without being broken up as it would if passed through the wire gauze mc forming a part of the filter strainer MA in the upper end of the filter J. The preservation of the flocculent character of the coagulum deposited on the top of the granular filter material in the filter J, I have found to be highly desirable and to add materially to the efficiency of the apparatus. Furthermore, the provisions made for insuring a quiet and even flow of water into the upper end of the coagulating chamber E and the quiet and distributed flow out of the latter from a level adjacent its lower end insure a fairly steady and uniform flow of coagulum out of the chamber E as well when the flow of water through the system is intermittent and irregular as when it is constant and fairly uniform. While there is a tendency for the coagulum to settle to the bottom of the chamber E with a corresponding clarification of the water in the upper portion of the chamber, this settling takes place slowly, and with commercial sizes and forms of the apparatus disclosed, will not carry the coagulum below the level of the lower end of the pipe E in a period of non-use as long as twelve hours or so. In consequence the coagulum will begin to flow out of the chamber E along with the water at once when water is first drawn from the system after any period of non-use to which such apparatus will ordinarily be subject.

$F^3$ represents an opening in the pipe F provided to limit the accumulation of air or gas in the coagulation chamber.

With the apparatus described either filter chamber may be readily flushed out from time to time as required. To flush out the tank J the valves H and HA are adjusted so that their handles stand in the dotted line positions. Water then passes from the coagulation chamber E through the valve H and pipe IA directly into the filter JA, and passes from the lower end of the latter through the pipes LA and L to the lower end of the filter J. This water passes upward through the filter J and leaves the latter through the pipe I' passing through the latter and the pipe I to the valve H and from the latter through the pipe $H^{10}$ to the sewer connection $H^{20}$, the valve in which is opened at this time. In this operation the valve K closes to prevent any flow out of the filter chamber J through the pipe I, and the filter screen MA in the upper end of the filter J prevents the granular filter material from being carried out of the filter chamber. When the filter JA is to be washed out, valve HA is set with its handle in the dotted line position but the valve H is adjusted to bring the handle H' into the full line position. Water then passes through the filter chamber J as in normal operation, but the water leaving the filter chamber J through the pipe L instead of returning to the valve H through the pipe $H^{10}$ passes to the bottom of the filter JA through the pipes L and LA, and the water leaving the filter JA at its upper end is carried by the pipes IA, valve H and pipe $H^{10}$ to the sewer connection $H^{20}$. In flushing out either filter, therefore, the flushing water flowing in the direction of the reverse of the normal through the filter being washed out is water which has been subjected to a preliminary purification by passage through the other filter.

To eliminate odor, due to decomposing organic matter, I preferably place a bag containing some chemical yielding chlorin gas in the chamber FA during the cleaning out operation. This is removed before the apparatus is again put into regular operation.

It will be apparent that when, for any reason, it is desired to pass water to the filtered water service discharge pipe LC after the water has gone through one but not both of the filters, this can be accomplished. To pass water to the service discharge pipe through the filter J without passing it through the filter JA, valve H is set with its handle H' in the full line position, and the valve HA is set with its handle in the dotted line position. To pass water through the filter JA from the coagulation chamber E to the pipe LB, the valve H is adjusted so that its handle H' occupies the dotted line position while the valve HA is so set that its operating handle occupies the full line position. When it is desired to flush out the coagulation chamber E this may be accomplished by opening the valved pipe connection $H^{11}$ between the bottom of the coagulation chamber and the pipe $H^{10}$ and at the same time opening the waste pipe $H^{20}$ and setting the valve HA into the position in which its handle occupies the dotted line position.

Advantageously, the filters are provided with hand hole openings, normally closed by covers $J^{10}$, located above the level of the granular filter material in the filters, to permit inspection of the interior of the filters and cleaning or repairing operations.

A convenient mode of supporting the electrode box is shown in Fig. 1, wherein the box is mounted on a bracket C' secured to the casing of the filter J.

To restrict the tendency of the water to flow along and make channels in the granular filter bed along the shaft N, I prefer to provide the latter with one or more collars $N^3$ for deflecting the water away from the shaft.

The special arrangement of the inlet to and outlet from the coagulation chamber E is not specifically claimed herein, but is so claimed in my copending application, Serial No. 844,403, filed June 11th, 1914, as a division of this application.

While in accordance with the provisions of the statutes I have illustrated and described the best form of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. In a water purification system the combination with a coagulation chamber of a filter chamber, a filter bed contained therein, and a filter screen located within the chamber above said bed, means for passing water in series through said coagulation chamber and filter chamber in normal operation and for passing water through the filter chamber in a reverse direction in cleaning said filter bed comprising a pipe connection for conveying water from said coagulation chamber to the filter chamber and opening to the latter above the filter bed and below the filter screen therein, means for preventing flow out of the filter chamber through said connection, and a valved outlet from said filter chamber opening from the latter above said filter screen.

2. In a water purification system the combination with a coagulation chamber of a filter chamber, a filter bed and a filter screen above the filter bed located in said chamber, and means for causing water to flow from the coagulation chamber into the filter chamber above the filter bed and thence down through the latter in normal operation and for causing a reverse flow of water through the filter bed in cleaning the latter, said means comprising a conduit conveying water from the coagulation chamber to the filter chamber in normal operation and opening to said filter chamber above the filter bed and below the filter screen, an automatic non-return valve in said conduit for preventing the outflow of water from said filter chamber through said connection and a valved outlet from said filter chamber opening from the latter above said filter screen.

HARRY B. HARTMAN.

Witnesses:
ARNOLD KATZ,
D. STEWART.